Jan. 28, 1964  W. F. ASHWORTH  3,119,116
PLASTIC TOOL
Filed June 12, 1959
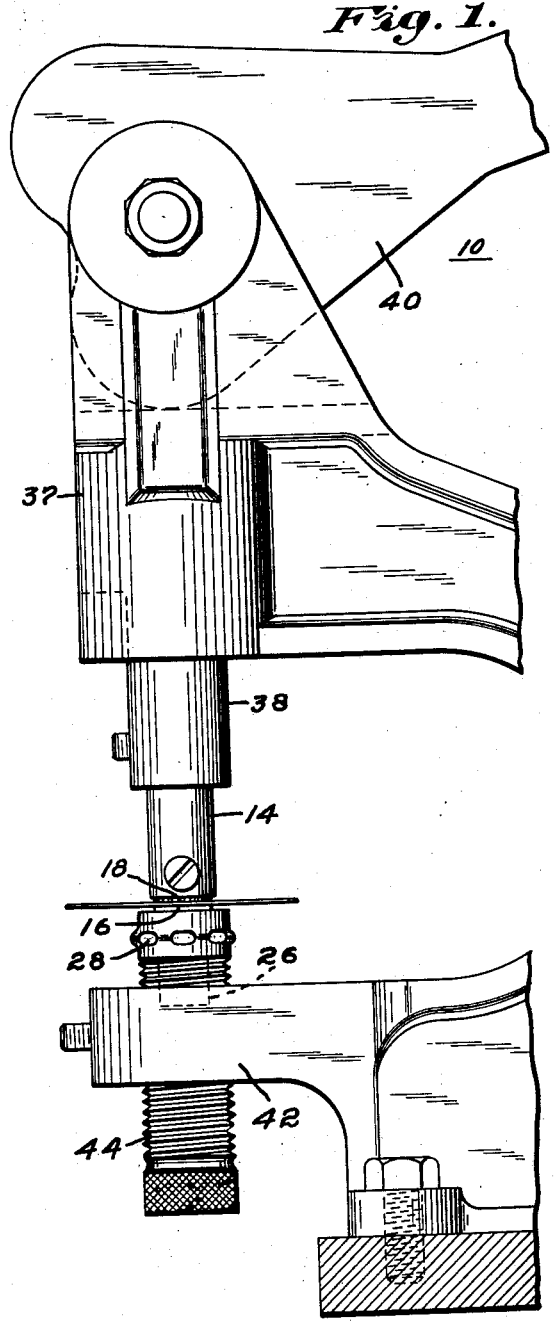
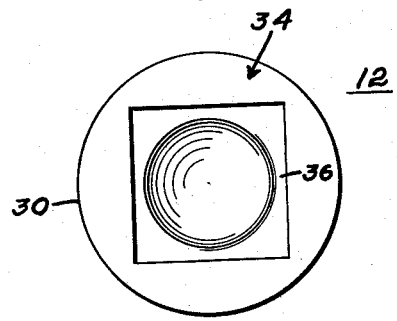
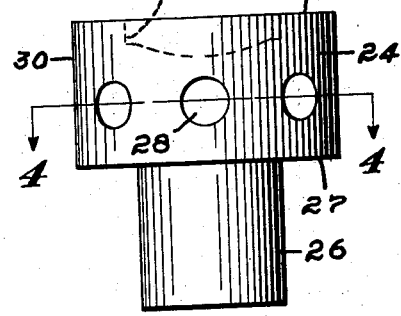
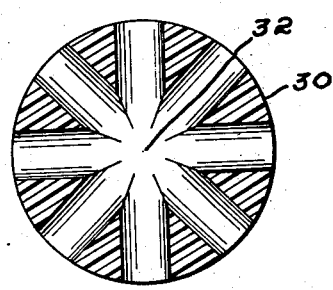
Inventor:
Winthrop F. Ashworth.
by Walter S. Jones Atty.

United States Patent Office 3,119,116
Patented Jan. 28, 1964

3,119,116
PLASTIC TOOL
Winthrop F. Ashworth, Wenham, Mass., assignor to United-Carr Fastener Corporation, Cambridge, Mass., a corporation of Delaware
Filed June 12, 1959, Ser. No. 819,925
1 Claim. (Cl. 1—324)

This invention relates generally to dies and the like and has particular reference to attaching tool dies.

The object of the invention is to provide an attaching tool die a portion of which is cored to allow for elastic deformation when in use.

A further object of the invention is to provide a plastic attaching tool die having a deformable apertured wall.

Other objects of the invention will, in part, be obvious, and will, in part, appear hereinafter.

In the drawing:

FIG. 1 is a side elevation of an attaching press showing the die under pressure;

FIG. 2 is a top plan view of the die;

FIG. 3 is a side elevation of the die with the fastening receptacle dotted in; and FIG. 4 is a cross section of the die taken on the line 4—4 of FIG. 3.

Referring to the drawing, there is illustrated a partial view of an attaching press 10, a plastic die 12, upper punch 14 and a fastener part comprising a pronged square "pearl" 16 and a socket 18. The square 16 is for the purposes of illustration only, since any number of different geometric forms can be used such as round, hexagonal, etc. The square "pearl" comprises three pieces, a pronged ring, the prongs of which actually pierce the material to which you are attaching the fastener part, the "pearl" (a term used in the decorative snap fastener trade but not a genuine pearl) which may be in any desired form but which is usually a hemisphere made of a plastic or fragile material such as glass or clam shell and a frame. The "pearl" is placed on the side of the ring opposite to that in which the prongs point with the arced portion facing in a direction opposite to that of the prongs. The frame, square in this case, is placed over the "pearl" with the arced portion protruding above the surface of the frame through the walls of the aperture formed in the frame and the frame then is fastened to the pronged ring.

The die 12 may be constructed from some type of semi-rigid plastic such as nylon, acrylic, acetal resin etc. The die 12 comprises a cylindrical body 24, and an integral shank 26. The diameter of the body 24 is greater than the shank 26 and it has a common axis with the shank 26 to form a shoulder 27 with the body 24. The body 24 has apertures 28 formed in its wall 30. The apertures 28 are formed by a drilling process to be explained hereinafter, which forms an internal cavity 32. The working face 34 of the body 24 is in integral right angle relationship to the wall 30 and is recessed to form a fastener receptacle 36 as shown in FIG. 2.

In the particular embodiment illustrated, the die 12 was constructed of nylon which was formed by taking a cylindrical solid bar, turning it on a lathe or other appropriate shaping machine to form the solid body and shank 26. The solid body is then drilled through its full diameter at several different points on the same plane, on the circumference of the body a predetermined distance from the face 34 and parallel therewith. The drilling process also serves to remove material abutting the axis to form the cavity 32.

Applicant has illustrated, in FIG. 1, a partial C-frame of a hand or foot operated press to explain the use of applicant's new plastic die. There are, of course, many different types of presses which could be used such as a hand lever type or one of the numerous semi-automatic or fully automatic power attaching machines. Referring specifically to FIG. 1, there is shown a partial C-frame having its top portion in the form of a ram housing 37. The ram 38 travels freely within the ram housing 37 in a vertical direction. The ram lever 40 can be mechanically operated by a mechanism old in the art. An upper punch or chuck 14 is removably fitted to the ram 38 at the end farthest from the ram lever 40. On the lower part of the C-frame in spaced opposed relation to the same ram housing 37 is a die bushing housing 42. An aperture is formed through the die bushing housing 42 and tapped so that a die bushing 44 may be screwed therein. The face of the die bushing 44 closest to the upper punch 14 is bored to accept the shank 26 of the die 12; the shoulder 27 rests on the face of the die bushing 44.

To use the die in the attaching press 10, the pronged "pearl" square 16 is set into the fastener receptacle 36 which may be of any convenient geometric form so as to securely hold it. The prongs of the square 16 are faced toward the upper punch 14, the upper punch 14 is also formed to accept a socket 18 which is so constructed that when the square 16 and the socket 18 are forced together through the action of the press 10, the square and socket are securely joined together. This attachment occurs through a material such as cloth or leather so that the square "pearl" 16 is attached to one side of the material and the socket 18 is attached to the other, at the same time being attached to the square pearl 16.

One of the greatest difficulties of attaching a square "pearl" to a socket in the type of machine heretofore mentioned was the fact that, on attachment, the "pearl" which was often made of synthetic plastic or other fragile material at the attaching impact would shatter. Applicant's die prevents fracturing of the "pearl" because of this shock of impact when the square is attached to the material and the socket. In applicant's device, when the punch 41 strikes the work, the face 34 of the body 24 of the die moves toward the shank 26. This distance the face 34 moves is pretty much the same throughout its whole surface. At the same time, the walls of the apertures 28 bow outward so that if the walls of apertures 28 were circular in form when the die is under pressure from the punch, these walls form ellipses. This spring like action of the body 24 which is partially brought about by the resiliency of the wall 30 absorbs the shock of impact, thus preventing a fracturing of the "pearl." Of course, the more apertures formed in the wall 30, the greater the resiliency and therefore the greater the absorbing quality. Of course, this resiliency cannot be carried to the point where it will allow the face 34 to "bottom" since a bottoming would destroy the effectiveness of the absorbtion. Although applicant has illustrated the apertures 28 as being circular and 8 in number, the apertures 28 may be two or more in number and may, if required, be square or rectangular in shape. The circular aperture however has been discovered to be most efficient. Since we are using materials which have excellent elastic memories, when the pressure is removed, the die will return to its original shape after impact. Because of this action, the main force of the impact on the pearl square 16 is distributed throughout the wall 30 of the body 24 and the "pearl" is left undamaged.

Since certain other obvious modifications may be made in this device without departing from the scope of the invention, it is intended that all matter contained herein be interpreted in an illustrative and not in a limiting sense.

I claim:

A die member for use in attaching a fragile part of a snap fastener and the like to a supporting material, said die member having a body portion of semi-rigid resilient plastic material, said body portion having a snap fastener part receiving cavity at one end face thereof and said body portion having a plurality of intersecting laterally extending apertures below said face providing walls for resilient compressive action of said body during attachment of a snap fastener part.

References Cited in the file of this patent

UNITED STATES PATENTS

| | | |
|---|---|---|
| 833,515 | Elliott | Oct. 16, 1906 |
| 1,270,148 | Goodlake | June 18, 1918 |
| 1,769,697 | Kuhn | July 1, 1930 |
| 2,145,320 | Shaw | Jan. 31, 1939 |
| 2,309,729 | Gordon | Feb. 2, 1943 |
| 2,361,688 | Huelster | Oct. 31, 1944 |
| 2,533,870 | Bayer | Dec. 12, 1950 |
| 2,763,893 | Hall | Sept. 25, 1956 |

FOREIGN PATENTS

| | | |
|---|---|---|
| 568,309 | Great Britain | Mar. 28, 1945 |